United States Patent
Mardjono et al.

(10) Patent No.: US 11,478,981 B2
(45) Date of Patent: Oct. 25, 2022

(54) METHOD FOR MANUFACTURING AN ORDERED NETWORK OF ACOUSTIC CHANNELS MADE OF ABRADABLE MATERIAL

(71) Applicant: SAFRAN AIRCRAFT ENGINES, Paris (FR)

(72) Inventors: Jacky Novi Mardjono, Moissy-Cramayel (FR); Arnaud Dubourg, Montreal (CA); Edith-Roland Fotsing, Montreal (CA); Annie Ross, Montreal (CA)

(73) Assignee: SAFRAN AIRCRAFT ENGINES, Paris (FR)

( * ) Notice: Subject to any disclaimer, the term of this patent is extended or adjusted under 35 U.S.C. 154(b) by 63 days.

(21) Appl. No.: 16/770,323

(22) PCT Filed: Dec. 6, 2018

(86) PCT No.: PCT/FR2018/053134
§ 371 (c)(1),
(2) Date: Jun. 5, 2020

(87) PCT Pub. No.: WO2019/110939
PCT Pub. Date: Jun. 13, 2019

(65) Prior Publication Data
US 2020/0353673 A1 Nov. 12, 2020

(30) Foreign Application Priority Data

Dec. 6, 2017 (CA) .................................. 2988223
Dec. 6, 2017 (FR) .................................. 17 61716

(51) Int. Cl.
*B29C 64/118* (2017.01)
*B33Y 10/00* (2015.01)
(Continued)

(52) U.S. Cl.
CPC .......... *B29C 64/118* (2017.08); *B29C 64/232* (2017.08); *B29C 64/236* (2017.08);
(Continued)

(58) Field of Classification Search
None
See application file for complete search history.

(56) References Cited

U.S. PATENT DOCUMENTS

2012/0228051 A1* 9/2012 Drevon .................... F02K 1/827
181/222
2015/0030803 A1* 1/2015 Butler ...................... B32B 3/266
428/107

(Continued)

FOREIGN PATENT DOCUMENTS

GB         2484350 A  *  4/2012  ........... B29C 70/205
WO    WO 2011/061430 A1    5/2011

OTHER PUBLICATIONS

International Search Report dated Mar. 4, 2019 in PCT/FR2018/053134 filed on Dec. 6, 2018, 3 pages.
(Continued)

*Primary Examiner* — Matthew J Daniels
*Assistant Examiner* — Paul Spiel
(74) *Attorney, Agent, or Firm* — Oblon, McClelland, Maier & Neustadt, L.L.P.

(57) ABSTRACT

A manufacturing method of an abradable coating consisting of depositing, on a substrate surface a filament of a thermosetting material while providing both a relative displacement between the substrate and the filament along a predetermined deposition path and solidification of the filament in order to create a three-dimensional scaffold of filaments, consisting of superimposed layers of which the filaments of a given layer are not contiguous and can be oriented differently from those of an adjacent layer, so as to confer upon
(Continued)

it acoustic wave absorption properties, the thermosetting material being a thixotropic mixture free of solvent and consisting of a polymer base and a cross-linking agent in a weight ratio of a polymer base to a cross-linking agent comprised between 1:1 and 2:1, and of a flowing component, typically a petroleum jelly present between 5 and 15% by weight of the total weight of the thixotropic mixture.

8 Claims, 2 Drawing Sheets

(51) Int. Cl.
| | |
|---|---|
| *B33Y 70/00* | (2020.01) |
| *F02C 7/24* | (2006.01) |
| *G10K 11/168* | (2006.01) |
| *B29K 101/10* | (2006.01) |
| *B29L 31/00* | (2006.01) |
| *B33Y 40/00* | (2020.01) |
| *B33Y 80/00* | (2015.01) |
| *B29C 64/314* | (2017.01) |
| *B29C 64/232* | (2017.01) |
| *B29C 64/236* | (2017.01) |

(52) U.S. Cl.
CPC ............ *B29C 64/314* (2017.08); *B33Y 10/00* (2014.12); *B33Y 40/00* (2014.12); *B33Y 70/00* (2014.12); *B33Y 80/00* (2014.12); *F02C 7/24* (2013.01); *G10K 11/168* (2013.01); *B29K 2101/10* (2013.01); *B29K 2995/0002* (2013.01); *B29L 2031/7504* (2013.01)

(56) References Cited

U.S. PATENT DOCUMENTS

2016/0151982 A1\* 6/2016 Sand ...................... B33Y 80/00
428/201
2016/0271872 A1 9/2016 Sand

OTHER PUBLICATIONS

French Preliminary Search Report and Written Opinion (with English Translation of Categories of Cited Documents) dated Aug. 28, 2018, in French Application No. 1761716 filed on Dec. 6, 2017, 7 pages.

\* cited by examiner

METHOD FOR MANUFACTURING AN ORDERED NETWORK OF ACOUSTIC CHANNELS MADE OF ABRADABLE MATERIAL

BACKGROUND OF THE INVENTION

The present invention relates to the general field of manufacturing of parts of polymer, particularly thermosetting materials, of metallic, metal alloy or ceramic parts by additive manufacturing and it relates more particularly, but not exclusively, to the manufacture of an abradable turbomachine wall coating such as an airplane turbojet.

The control of noise nuisances due to airplanes in the vicinity of airports has become a public health challenge. Ever more severe standards and regulations are imposed on airplane manufacturer and on airport managers. Consequently, building a silent airplane has become a strong selling point over the years. Currently, noise generated by airplane engines is attenuated by localized reaction acoustic coatings which allow reducing the noise intensity of the engine over one or two octaves, based on the principle of Helmholtz resonators, these coatings conventionally appearing in the form of composite panels consisting of a rigid plate associated with a honeycomb core covered with a perforated skin and located in the nacelle or the upstream and downstream propagation channels. However, in the new engine generations (for example in turbofans), the zones available for acoustic coatings are caused to be substantially reduced, as in the UHBR (ultra-high bypass ratio) technology.

It is therefore important to propose new methods and/or new materials (particularly porous materials) allowing eliminating or significantly reducing the level of noise produced generated by airplane engines, especially in the phases of takeoff and landing and over a wider frequency range than currently, including the low frequencies while still retaining the performance of the engine. That is the reason for which new acoustic treatment surfaces are sought today, this with minimum impact on the other functionalities of the engine such as specific fuel consumption with constitutes an important commercial advantage.

Moreover, it is customary and advantageous today to have recourse to methods of additive manufacturing instead of the traditional foundry or machining methods in the mass to easily and rapidly produce, at reduced cost, complex three-dimensional parts. The aeronautical field lends itself particularly well to the use of these methods. Among them can be cited in particular the wire beam deposition method.

OBJECT AND SUMMARY OF THE INVENTION

The present invention therefore has as its object to propose a forming method for a new material, which can significantly reduce the noise generated by airplane turbojets. The control of the parameters of the material allows noise reduction over a range extending from low to high frequencies. Products originating from this method are intended to be mounted on a wall of a turbojet in contact with a fluid flow and more particularly instead of a fan casing abradable cartridge.

To this end, a manufacturing method of an abradable coating is proposed consisting of depositing on a substrate surface a filament of a thermosetting material while providing both a relative displacement between said substrate and said filament along a predetermined deposition path and solidification of said filament in order to create a three-dimensional scaffold of filaments, consisting of superimposed layers of which the filaments of a given layer are not contiguous and can be oriented differently from those of an adjacent layer, so as to confer upon it acoustic wave absorption properties, characterized in that said thermosetting material is a thixotropic mixture free of solvent and consisting of a polymer base and of a cross-linking agent in a weight ratio of said polymer base to said cross-linking agent comprised between 1:1 and 2:1, and of a flowing component, typically a petroleum jelly present between 5 and 15% by weight of the total weight of said thixotropic mixture.

Thus one obtains a porous microstructure with regular and ordered porosity which ensures considerable absorption of acoustic waves by visco-thermal dissipation within the channels while retaining its abradable nature due to the material constituting it.

Preferably, said thixotropic mixture is obtained by co-extrusion of said components in a conical extrusion screw and deposited on said substrate surface by means of an ejection nozzle with calibrated shape and dimensions, the output cross section of which has a major width less than 250 microns.

Advantageously, the relative displacement between said substrate and said cylindrical filament is provided by a machine with at least three axes or a robot controlled from a computer, and the solidification of said cylindrical filament is provided by a heating element mounted at the output of said calibrated ejection nozzle.

Depending on the embodiment considered, said three-dimensional scaffold can consist:

- of superimposed layers of which the filaments of a given layer are oriented alternately at 0° or at 90°, with no offset in the superimposition of filaments of the same direction;
- of superimposed layers of which the filaments of a given layer are oriented alternately at 0° or at 90°, having an offset in the superimposition of filaments of the same direction;
- of superimposed layers having orientation directions of the filaments Di offset by the same angular deviation, comprised between 20° and 40°, typically 30°, at each layer i;
- or even superimposed layers of filaments having, for each of the layers, both an orientation of filaments at 0° and an orientation of filaments at 90°, so as to form vertical perforations with square cross sections between the filaments.

The invention also relates to the abradable turbomachine wall coating obtained from the manufacturing method.

BRIEF DESCRIPTION OF THE DRAWINGS

Other features and advantages of the present invention will be revealed by the detailed description given below, with reference to the following figures free of any limiting character in which.

DETAILED DESCRIPTION OF THE INVENTION

The method according to the invention allows printing an abradable material on a substrate for the purpose of creating a three-dimensional scaffold of filaments forming between them an ordered array of channels having acoustic properties.

What is meant by abradable material is the capacity of the material to break apart (or erode) during operation in contact with a facing part (low resistance to shear) and its resistance to wear following impacts of particles or foreign bodies which it is made to ingest during operation (compromise with abradability). A material of this type must also retain, even favor good aerodynamic properties (roughness criterion: Ra on surface state), have sufficient resistance to oxidation and to corrosion and a thermal dilation coefficient of the same order as the layer or the substrate on which it is deposited.

Figure 1:
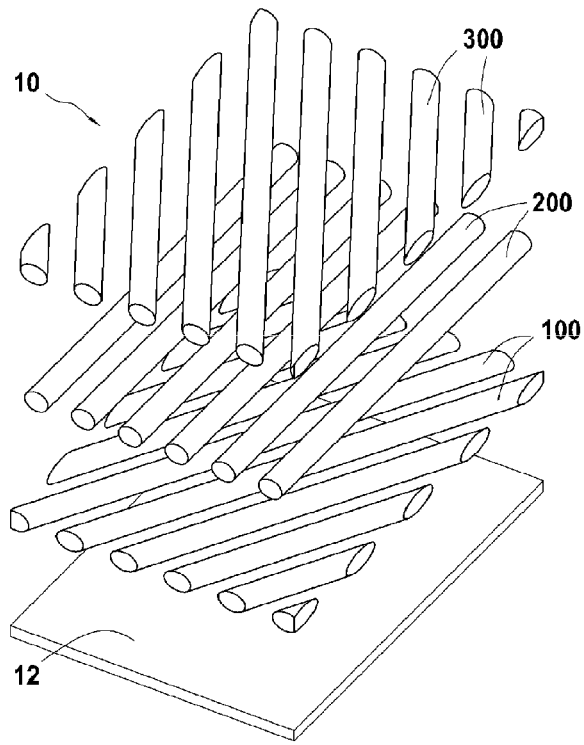
FIG. 1 illustrates in exploded perspective the assembly of a three-dimensional scaffold of filaments of abradable material conforming to the invention.

FIG. 1 illustrates in exploded perspective a portion of a three-dimensional scaffold 10 of filaments 100, 200, 300, advantageously cylindrical, of an abradable material allowing, in conformity with the invention, the production of a coating in the form of an ordered array of a nature to confer acoustic properties to a wall (the substrate) 12 intended to receive this coating. Depending on the array configuration considered, interconnections between the channels can exist in a regular manner during the superimposition of the different layers of the abradable material intended to generate these different channels. This wall is preferably, without this being limiting, a wall of a turbomachine such as an airplane turbojet and more particularly a 3D-woven composite casing located at the periphery of the fan blades and customarily intended to receive an abradable cartridge.

Figure 2:
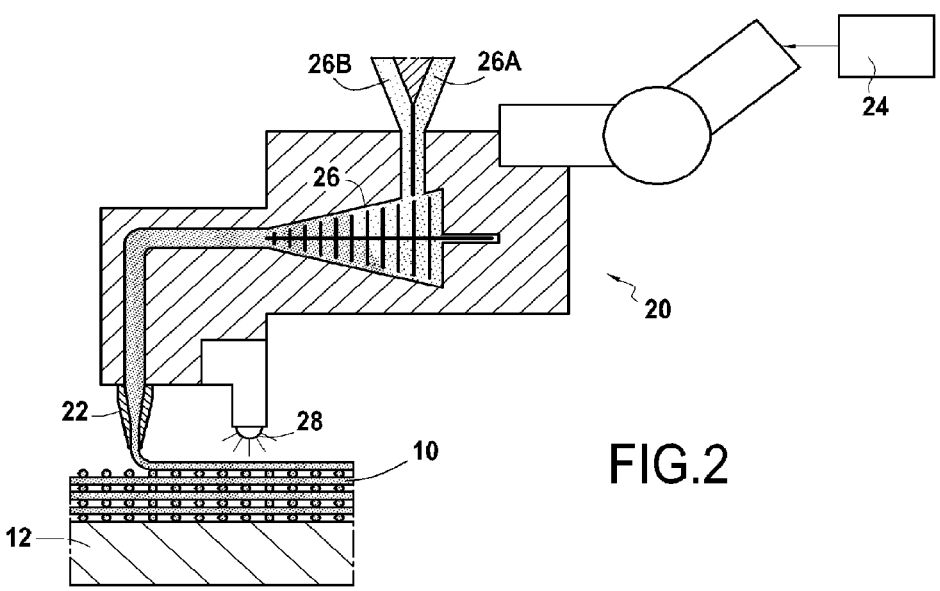
FIG. 2 illustrates the filament deposition system for the production of the three-dimensional scaffold of FIG. 1, and FIGS. 3A to 3D show four examples of three-dimensional scaffolds having acoustic properties.

The printing of an ordered array of this type is carried out by additive manufacturing according to the method described hereafter with reference to FIG. 2. This printing requires accurate equipments allowing controlling the deposition of the abradable material and thus ensuring the final dimensional tolerancing. For this purpose, it must have at least one 3-axis machine of the ABG10000 type from Aerotech Incorporation or a robot having accurate "digital axes" (positioning on the order of 5 microns) allowing, via an incorporated program, the control of the printing according to a deposition path defined by the user. Thanks to this equipment, it is therefore possible to guarantee an accurate deposit of filaments in a predetermined three-dimensional space, by controlling printing parameters such as the flow speed of the material, the position and speed of displacement of the printing.

As shown by FIG. 2, a filamentary deposition system, a machine with at least 3 axes or a robot 20, deposits, preferably in connection with a pressure and temperature control circuit internal to the system, the abradable material by extrusion via an ejection nozzle 22 with calibrated shape and dimensions, first of all on the substrate 12 then successively on the different superimposed layers created afterward until the desired thickness is obtained. The filamentary deposition system follow a deposition path controlled by a computer (computer or microcontroller 24) to which it is connected, providing control of the filamentary deposition system and monitoring at every point of the treated surface both the filamentary arrangement and the porosity of the medium necessary for guaranteeing the desired abradability.

The supply of abradable material is provided from a conical extrusion screw 26 allowing mixing several components to form a thixotropic mixture having the appearance of a paste. The conical extrusion screw which includes at least two separate inputs 26A, 26B for the simultaneous introduction of at least two components allows ensuring an adequate and homogeneous mixture of the components throughout the deposition operation, to ultimately obtain a fluid material with high viscosity which will be deposited by the ejection nozzle 22, the output cross section of which, in its major width, is less than 250 microns. During this operation, the generation of air bubbles, which form as many defects in the filament during printing, must be avoided, and it is therefore necessary to very progressively push the material while controlling the pressure in the ejection nozzle and its displacement speed, so as to obtain a filament with a uniform cross section and compliant position. It will be noted that it is possible to change the constitution of the material deposited by control of the components introduced into the conical extrusion screw.

A heat lamp 28 or any similar device can be mounted at the output of the ejection nozzle 22 to stabilize the deposited material and avoid creep during deposition. The deposition of the abradable material is carried out until a specified thickness. To accelerate the deposition of the material, the filamentary deposition system 20 can include several independently adjustable nozzles or include a multi-nozzle with a calibrated diameter as described in application US 2017/203566.

A controlled deposit of material abradable in its thickness or on its surface, allow the functionalization of the abradable, particularly for the purpose of conferring acoustic properties upon it.

Figure 3A:
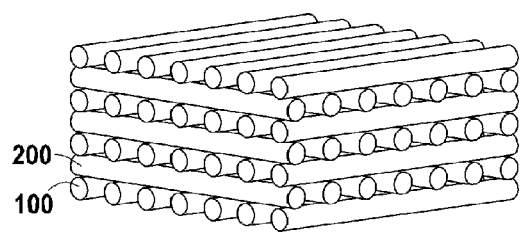

For this purpose, the ordered array of channels has advantageously a scaffold having one of the configurations illustrated in FIGS. 3A, 3B, 3C and 3D, namely:

In FIG. 3A, a three-dimensional scaffold of filaments 100, 200 consists of superimposed layers of which the filaments of a given layer are oriented alternately at 0° or at 90° with no offset in the superimposition of filaments in the same direction.

Figure 3B:
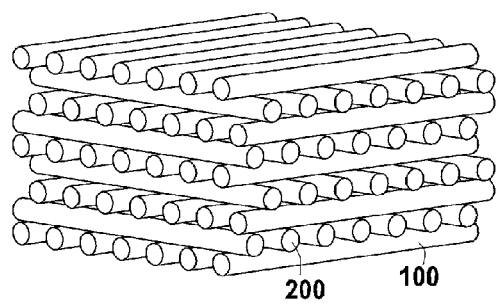

In FIG. 3B, a three-dimensional scaffold of filaments 100, 200 consists of superimposed layers of which the filaments of a given layer are oriented alternately at 0° or at 90° and have an offset in the superimposition of filaments in the same direction. This offset is preferably, as illustrated, equal to half the distance between two filaments.

It will be noted that, for these two configurations, the angular deviation between the two filament directions can be different, and less than 90°, for example 45°.

Figure 3C:
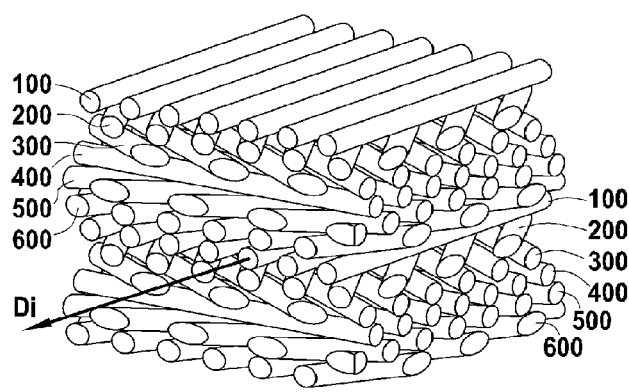

In FIG. 3C, a three-dimensional scaffold of filaments 100, 200, 300, 400, 500, 600 consists of superimposed layers having orientation directions of the filament Di offset by the same angular deviation, comprised between 20° and 40°, typically 30°, at each layer i (i comprised between 1 and 6 for an angular deviation of 30°).

Figure 3D:
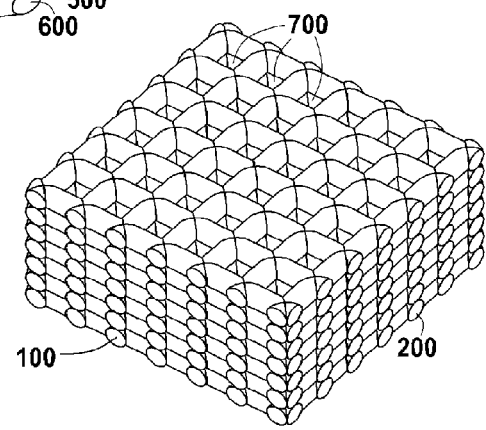

And in FIG. 3D, a three-dimensional scaffold of filaments 100, 200 consists of superimposed layers of filaments having, for each of the layers, both an orientation of filaments at 0° and an orientation of filaments at 90°, so as to form vertical perforations 700 with square cross sections between the filaments. In each of these four configurations, the desired porosity (void percentage) is typically greater than 60%.

Printing on a casing sector with these different structures has shown the feasibility of a robotized deposition of this type of abradable material according to the aforementioned method of additive manufacturing. Tests of mechanical behavior in compression and bending have also been carried out, as well as samples intended for a low-energy impact test or for a characterization of the acoustic impedance at normal incidence.

In particular, transmission of acoustic energy through the scaffold and absorption of a portion of this acoustic energy by modification of the aero-acoustic sources or absorption of the propagating acoustic waves have been observed.

The abradable material extruded by the calibrated nozzle(s) is advantageously a thermosetting material with high viscosity (also called fluid) with is free of solvent, the evaporation of which generates, as is known, strong shrinkage. This material is preferably a resin with slow polymerization kinetics and stable filamentary flow, appearing in the form of a thixotropic mixture which therefore had the advantage of much less shrinkage between printing on the substrate (just after extrusion of the material) and the final structure (once heated and polymerization completed).

One example of an abradable material used in the context of the method is a material appearing in paste form and consisting of three components, namely a polymer base, for example an epoxy resin (with the appearance of a blue modeling paste), a cross-linking agent or accelerator (appearing as a white modeling paste) and a translucent petroleum jelly (for example Vaseline™). The accelerator/base components are distributed according to a weight ration of the base to the accelerator comprised between 1:1 and 2:1 and the petroleum jelly has between 5 and 15% (typically 10%) by weight of the total weight of the material. The base can also include hollow glass microspheres with a predetermined diameter to ensure the desired porosity while allowing increasing the mechanical performance of the printed scaffold. The value of the introduction of the petroleum jelly resides in the reduction of the viscosity of the resin as well as the reaction kinetics of the abradable, which makes its viscosity more stable during the printing period. (The viscosity is directly linked to the extrusion pressure necessary to ensure adequate extrusion speed for maintaining the quality of the printing).

By way of an example, a 2:1 ratio of this type gives an abradable material comprising 0.7 g of accelerator and 1.4 g of base, to which it is appropriate to add 0.2 g of petroleum jelly.

Thus the present invention allows rapid (30 mm/s) and stable printing and allowing effective reproduction of controlled high-performance acoustic structures (roughness, appearance, opening ratio) having a small filament size (<250 microns in diameter) and low weight (improved porosity ratio>60%) particularly valuable considering the strong stresses encountered in aeronautics.

The invention claimed is:

1. A manufacturing method of an abradable coating comprising:
   depositing on a turbomachine wall a filament of a thermosetting material while providing both a relative displacement between said turbomachine wall and said filament along a predetermined deposition path and solidification of said filament in order to create a three-dimensional scaffold of filaments, comprising superimposed layers of which the filaments are not contiguous and can be oriented differently from the filaments of an adjacent layer, so as to confer acoustic wave absorption properties,
   wherein said thermosetting material is a thixotropic mixture including a polymer base and a cross-linking agent in a weight ratio of said polymer base to said cross-linking agent comprised between 1:1 and 2:1, and a flowing component present between 5 and 15% by weight of a total weight of said thixotropic mixture.

2. The manufacturing method according to claim 1, wherein said thixotropic mixture is obtained by co-extrusion of said polymer base and said cross-linking agent in a conical extrusion screw and deposited on said turbomachine wall with an ejection nozzle with calibrated shape and dimensions, an output cross section of which has a major width less than 250 microns.

3. The manufacturing method according to claim 1, wherein the relative displacement between said turbomachine wall and said filament is provided by a machine with at least three axes or a robot controlled from a computer.

4. The manufacturing method according to claim 1, wherein the solidification of said filament is provided by a heating element mounted at an output of said calibrated ejection nozzle.

5. The manufacturing method according to claim 1, wherein said three-dimensional scaffold of filaments comprises superimposed layers of which the filaments of a given layer are oriented alternately at 0° or at 90°, with no offset in the superimposition of filaments of the same direction.

6. The manufacturing method according to claim 1, wherein said three-dimensional scaffolding of filaments comprises superimposed layers of which the filaments of a given layer are oriented alternately at 0° or at 90° and have an offset in the superimposition of filaments of the same direction.

7. The manufacturing method according to claim 1, wherein said three-dimensional scaffold of filaments of comprises superimposed layers of filaments having orientation directions of the filaments Di offset by the same angular deviation, comprised between 20° and 40° at each layer i.

8. The manufacturing method according to claim 1, wherein said three-dimensional scaffold of filaments comprises superimposed layers of filaments having, for each of the layers, both an orientation of filaments at 0° and an orientation of filaments at 90°, so as to form vertical perforations with square cross sections between the filaments.

* * * * *